United States Patent
Gregg et al.

(10) Patent No.: US 10,690,855 B2
(45) Date of Patent: Jun. 23, 2020

(54) TAPERED NON-CONCENTRIC CORE FIBERS

(71) Applicant: Lumentum Operations LLC, Milpitas, CA (US)

(72) Inventors: Patrick Gregg, Santa Clara, CA (US); Richard D. Faulhaber, San Carlos, CA (US); James J. Morehead, Oakland, CA (US); Vincent Petit, Cupertino, CA (US); Martin H. Muendel, Oakland, CA (US)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 16/573,814

(22) Filed: Sep. 17, 2019

(65) Prior Publication Data

US 2020/0081187 A1 Mar. 12, 2020

Related U.S. Application Data (63) Continuation-in-part of application No. 16/457,018, filed on Jun. 28, 2019, and a continuation-in-part of
(Continued)

(51) Int. Cl.
*G02B 6/44* (2006.01)
*G02B 6/255* (2006.01)
*G02B 6/25* (2006.01)

(52) U.S. Cl.
CPC ............ *G02B 6/2552* (2013.01); *G02B 6/25* (2013.01); *G02B 6/2555* (2013.01)

(58) Field of Classification Search
USPC .................................................. 385/100–104
See application file for complete search history.

(56) References Cited

U.S. PATENT DOCUMENTS

| | | | |
|---|---|---|---|
| 4,962,994 | A | 10/1990 | Someda et al. |
| 5,290,280 | A | 3/1994 | Daikuzono et al. |
| 5,701,376 | A | 12/1997 | Shirasaki et al. |
| 7,019,902 | B2 | 3/2006 | Deile et al. |

(Continued)

FOREIGN PATENT DOCUMENTS

| | | |
|---|---|---|
| CN | 103969739 A | 8/2014 |
| EP | 0227366 A2 | 7/1987 |

(Continued)

OTHER PUBLICATIONS

Alekseev K.N., et al., "Twisted Optical Fibers Sustaining Propagation of Optical Vortices," Optics and Spectroscopy, Jan. 2005, vol. 98 (1), pp. 53-60.

(Continued)

*Primary Examiner* — Eric Wong
(74) *Attorney, Agent, or Firm* — Harrity & Harrity, LLP (57) ABSTRACT

A device may splice, at a target splice point, a first end of a twisted fiber having a non-concentric core to an input end of a target fiber having a concentric core to form a spliced fiber wherein the concentric core of the target fiber and the non-concentric core of the twisted fiber have a particular offset at the target splice point. The device may taper at least a portion of the twisted fiber to form a tapered region of the spliced fiber and such that the particular offset at the target splice point corresponds to a pre-configured core offset wherein the target splice point is within the tapered region of the spliced fiber.

20 Claims, 6 Drawing Sheets

Related U.S. Application Data application No. 15/802,897, filed on Nov. 3, 2017, now Pat. No. 10,429,584.

(60) Provisional application No. 62/817,858, filed on Mar. 13, 2019, provisional application No. 62/715,040, filed on Aug. 6, 2018, provisional application No. 62/425,431, filed on Nov. 22, 2016.

(56) References Cited

U.S. PATENT DOCUMENTS

| | | | |
|---|---|---|---|
| 7,424,193 | B2 | 9/2008 | Galvanauskas et al. |
| 8,111,957 | B2 | 2/2012 | Alfano et al. |
| 8,946,586 | B2 | 2/2015 | Bea et al. |
| 2005/0247479 | A1 | 11/2005 | Kenny et al. |
| 2006/0050392 | A1 | 3/2006 | Schulz |
| 2008/0115958 | A1 | 5/2008 | Stutzman et al. |
| 2013/0148925 | A1 | 6/2013 | Muendel et al. |
| 2013/0301998 | A1 | 11/2013 | Hayashi et al. |
| 2017/0299806 | A1* | 10/2017 | Kopp ............... G02B 6/02042 |
| 2017/0370704 | A1 | 12/2017 | Froggatt et al. |
| 2018/0088343 | A1 | 3/2018 | Kliner et al. |
| 2018/0088357 | A1 | 3/2018 | Kliner et al. |
| 2018/0088358 | A1 | 3/2018 | Kliner et al. |
| 2018/0143377 | A1 | 5/2018 | Muendel et al. |
| 2019/0317280 | A1 | 10/2019 | Muendel et al. |

FOREIGN PATENT DOCUMENTS

| | | |
|---|---|---|
| WO | 2004027476 A1 | 4/2004 |
| WO | 2009010043 A2 | 1/2009 |

OTHER PUBLICATIONS

Alexeyev C.N., et al., "Filter of Optical Vortices: Highly Twisted High-Birefringence Optical Fibers," Optics Letters, Jan. 2006, vol. 31 (1), pp. 8-10.

Beijersbergen M.W., et al., "Helical-Wavefront Laser Beams Produced With a Spiral Phaseplate," Optics Communications, Dec. 1994, vol. 112 (5-6), pp. 321-327.

Dawei, Y., et al., "Spatial Mode Rotator Based on Mechanically Induced Twist and Bending in Few-Mode Fibers," Visual Communications and Image Processing, Jan. 15, 2015, vol. 9389, 8 pages.

Extended European Search Report for Application No. EP17202443.2, dated Apr. 20, 2018, 9 pages.

Kennedy S.A., et al., "Creation of Laguerre-Gaussian Laser Modes Using Diffractive Optics," Physical Review A, 2002, vol. 66 (4), pp. 043801.1-043801.5.

Lee W.M., et al., "Experimental Observation of Optical Vortex Evolution in a Gaussian Beam With an Embedded Fractional Phase Step," Optics Communications, Sep. 2004, vol. 239 (1-3), pp. 129-135.

Napiorkowski M., et al., "Rigorous Simulations of a Helical Core Fiber by the Use of Transformation Optics Formalism," Optics Express, Sep. 2014, vol. 22 (19), pp. 23108-23120.

Scipioni M., et al., "Mode Purity Comparison of Optical Vortices Generated by a Segmented Deformable Mirror and a Static Multilevel Phase Plate," Applied Optics, Oct. 2008, vol. 47 (28), pp. 5098-5102.

Strohaber J., et al., "Ultrashort Intense-Field Optical Vortices Produced With Laser-Etched Mirrors," Applied Optics, Dec. 2007, vol. 46 (36), pp. 8583-8590.

Tyson R.K., et al., "Generation of an Optical Vortex With a Segmented Deformable Mirror," Applied Optics, Nov. 2008, vol. 47 (33), pp. 6300-6306.

Wang P., et al., "Cladding-Pumped Yb-Doped Helical-Core Fibre Lasers and Amplifiers," European Conference on Lasers and Electro-Optics, 2005, 1 page.

Wang P., et al., "Efficient Single-Mode Operation of a Cladding Pumped Ytterbium-Doped Helical-Core Fiber Laser," Optics Letters, Jan. 2006, vol. 31 (2), pp. 226-228.

Wang P., et al., "Helical-Core Ytterbium-Doped Fibre Laser," Electronics Letters, Oct. 2004, vol. 40 (21), pp. 1325-1326.

* cited by examiner

TAPERED NON-CONCENTRIC CORE FIBERS

RELATED APPLICATION(S)

This application is a continuation-in-part (CIP) of U.S. patent application Ser. No. 16/457,018, filed on Jun. 28, 2019, and entitled "ROTARY OPTICAL BEAM GENERATOR", which claims priority to U.S. Provisional Patent Application No. 62/715,040, filed on Aug. 6, 2018 and entitled "ROTARY OPTICAL BEAM GENERATOR", and which is a continuation-in-part (CIP) of U.S. patent application Ser. No. 15/802,897, filed on Nov. 3, 2017, and entitled "ROTARY OPTICAL BEAM GENERATOR", which claims priority under 35 U.S.C. § 119 to U.S. Provisional Patent Application No. 62/425,431, filed on Nov. 22, 2016, and entitled "ROTARY OPTICAL BEAM GENERATOR", the contents of which are incorporated by reference herein in their entirety.

This application claims priority under 35 U.S.C. § 119 to U.S. Provisional Patent Application No. 62/817,858, filed on Mar. 13, 2019, and entitled "OFFSET SPLICE FOR CONTROLLED FIBER EXCITATION" the content of which is incorporated by reference herein in its entirety.

TECHNICAL FIELD

The present disclosure relates to optical fibers and to a tapered, spliced non-concentric core twisted fiber that couples an input fiber with a first diameter to a target fiber with a second diameter that is different from the first diameter and generates a rotary optical beam with a particular beam shape (e.g., without using free-space optics).

BACKGROUND

A beam profile of an optical beam has a significant impact on processing performance associated with material processing performed using the optical beam. For example, an optical beam with an annular beam profile can enable superior metal cutting. However, beam profiles of most fiber-delivered optical beams are relatively simplistic. For example, the beam profile may be a Gaussian or near-Gaussian profile for a low-beam-parameter-product (BPP) laser (e.g., a BPP of less than or equal to approximately 3 millimeters times milliradians (mm-mrad)) that can be used for processing thin sheet metal (e.g., sheet metal with a thickness of less than or equal to approximately 3 mm) using a tightly focused optical beam. As another example, the beam profile may be a top-hat (sometimes referred to as a flat-top) profile for a high BPP laser (e.g., a BPP of greater than approximately 3 mm-mrad) that can be used for processing thick sheet metal (e.g., sheet metal with a thickness greater than approximately 3 mm) using a larger beam. A spliced fiber may cause an optical beam to have a particular beam profile. The spliced fiber may include an input fiber, a twisted fiber, and a target fiber that are spliced together to form the spliced fiber.

SUMMARY

According to some implementations, a method may include splicing, by a device and at a target splice point, a first end of a twisted fiber having a non-concentric core to an input end of a target fiber having a concentric core to form a spliced fiber, wherein the concentric core of the target fiber and the non-concentric core of the twisted fiber have a particular offset at the target splice point; and tapering, by the device, at least a portion of the twisted fiber to form a tapered region of the spliced fiber and such that the particular offset at the target splice point corresponds to a pre-configured core offset, wherein the target splice point is within the tapered region of the spliced fiber.

According to some implementations, a spliced fiber may include a twisted fiber having a non-concentric core section that twists about an axis of the twisted fiber along a length of the twisted fiber; and a target fiber spliced to the twisted fiber at a target splice point and having a concentric core section, wherein a tapered region of the spliced fiber includes at least a portion of the twisted fiber and at least a portion of the target fiber such that the target splice point is within the tapered region, and wherein the tapered region is tapered such that an offset, at the target splice point, of a first axis of the non-concentric core section and a second axis of the concentric core section corresponds to a pre-configured core offset.

According to some implementations, a twisted fiber may include a non-concentric core section that twists about an axis of the twisted fiber along a length of the twisted fiber; a first end to receive a target fiber with a first concentric core section at a target splice point; and a second end to receive an input fiber with a second concentric core section at an input splice point, wherein at least a portion of the twisted fiber is tapered to form a tapered region such that the target splice point is included within the tapered region, and wherein an offset, at the target splice point, of a first axis of the non-concentric core section and a second axis of the concentric core section corresponds to a pre-configured core offset.

DETAILED DESCRIPTION

The following detailed description of example implementations refers to the accompanying drawings. The same reference numbers in different drawings may identify the same or similar elements.

As described above, beam shapes of fiber-delivered optical beams are relatively simplistic (e.g., having a Gaussian or near-Gaussian profile, a top-hat profile, and/or the like). Generating an optical beam with a comparatively more advanced beam shape, such as an annular beam shape (i.e., a ring-shaped beam) generally takes expensive, specialized, alignment-sensitive free-space optics, such as axicons, spiral phase plates, and/or the like. Moreover, such optics may need to be located in a processing head, distal to a fiber associated with delivering the optical beam. The processing head is an opto-mechanical assembly that is subject to acceleration and contamination (e.g., from smoke, metal debris, dust, and/or the like), and is therefore an undesirable location for expensive, alignment-sensitive, bulky, and/or heavy optical elements.

Further, previous techniques for generating an optical beam with an annular beam shape typically provide an optical beam with poor beam quality. For example, the previous techniques may generate an optical beam with an excessively high BPP, an excessive amount of power in a middle of the annulus, diffuse beam edges (e.g., with a relatively long radial tail of power that causes poor processing quality), and/or the like.

Offset splices may involve decentering an input fiber and a target fiber by a predetermined amount. Offset splices may be used to achieve turn-key fiber laser (TKFL) designs. However, offset splices may require manual displacement of the input fiber and the target fiber to achieve the predetermined amount of decentering. As a result, alignment may be operator dependent and resulting performance may be operator dependent. Moreover, surface tension characteristics of glass in the input fiber and the target fiber may induce a decrease in the pre-configured amount of decentering, which may result in difficulty in achieving the pre-configured amount of decentering using manual alignment.

A twisted fiber may be introduced to couple the input fiber to the target fiber. The twisted fiber may include a waveguide core that is offset from a geometric center of the fiber. A taper may be introduced on the twisted fiber to control modal excitation and resultant beam shapes. Previous techniques included performing the tapering process on the twisted fiber and then coupling the twisted fiber to, for example, the target fiber. As a result, a pitch at a splice point between the twisted fiber and the target fiber may remain unchanged by the tapering and splicing processes. As a result of the taper being performed before the splice, the taper affects the pitch inside the twisted fiber but not at the target splice point. However, such techniques resulted in poor levels of control of the modal excitation and the resultant beam shapes.

Some implementations described herein enable improved manufacturing of an offset splice. For example, a target fiber may be coupled to a twisted fiber and then the target fiber and the twisted fiber may be tapered together. As a result, the pitch at a target splice point where the twisted fiber and the target fiber are spliced can be changed by altering tapering parameters, thereby allowing additional control of the modal excitation and the resultant beam shapes by controlling the tapering parameters. Furthermore, by controlling the resultant beam shapes, increasing beam parameter products may be caused in the target fiber during operation, which may improve manufacturing processes performed using optical beams passed through the target fiber. Moreover, by positioning a splice point where the target fiber is spliced to the twisted fiber within a tapered region, the beam parameter products may be controlled without altering parameters of the tapered region. For example, a distance between a taper waist (e.g., a smallest diameter section of a tapered region) and a position of a target splice point may be used to control an offset between a concentric core of the target fiber and a non-concentric core of a twisted fiber and/or an angular orientation (e.g., of a beam profile), which may be used to control parameters of an optical beam. In this way, processes described herein enable control of the parameters of the optical beam by altering the distance between the taper waist and the position of the target splice point, thereby improving controllability of the parameters of the beam relative to previous techniques.

Figure 1:
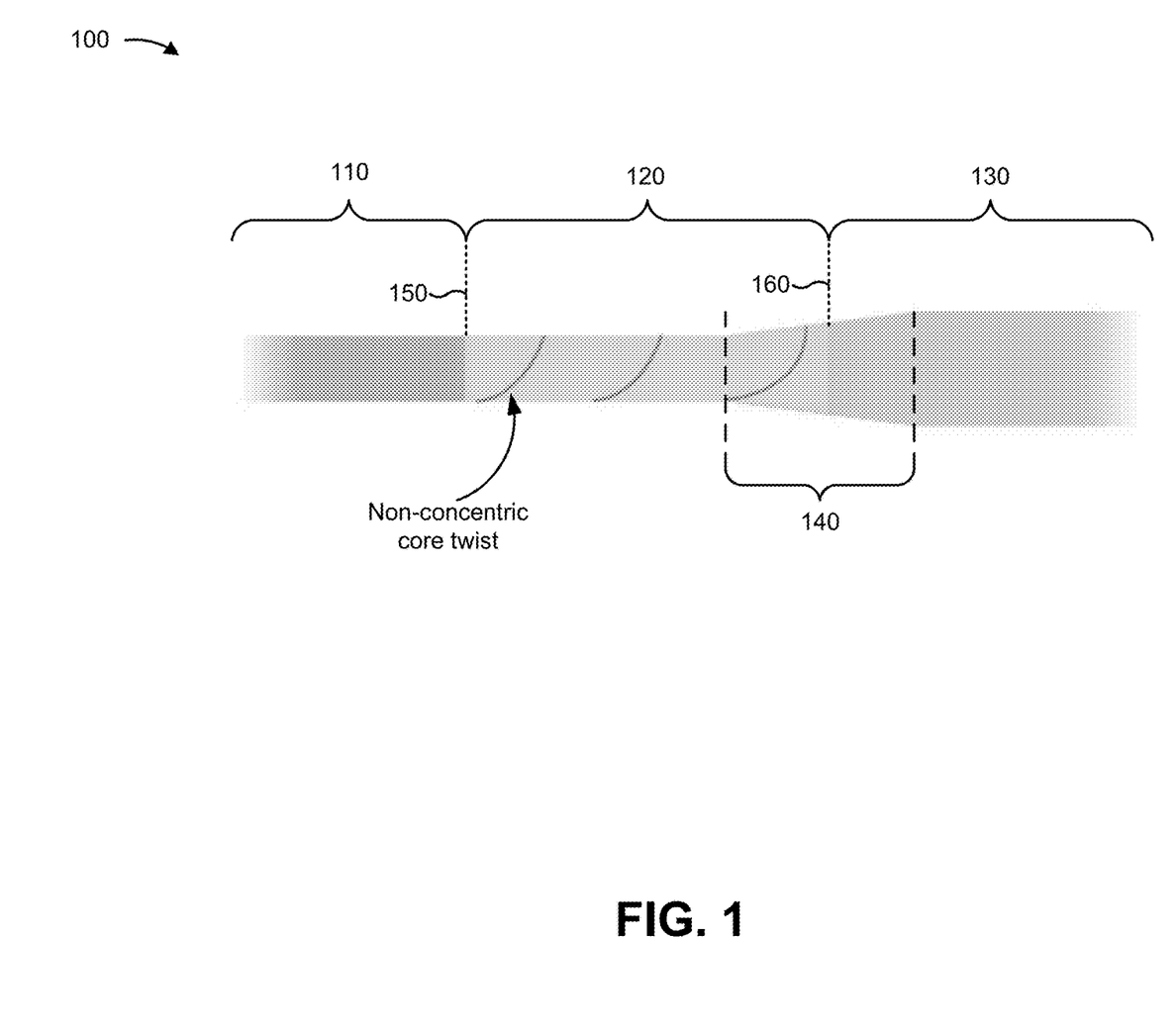
FIG. 1 is a diagram of an example implementation described herein.

FIG. 1 is a diagram of a spliced fiber 100 described herein. As shown in FIG. 1, spliced fiber 100 includes an input fiber 110, a twisted fiber 120, and a target fiber 130. A tapered region 140 may be defined for spliced fiber 100 as a portion of spliced fiber 100 that is tapered.

Input fiber 110 may include a concentric core to convey a beam to twisted fiber 120. Input fiber 110 may couple to twisted fiber 120 at an input splice point 150. In some implementations, a concentric core of input fiber 110 may be offset from a non-concentric core of twisted fiber 120. For example, the concentric core of input fiber 110 may be offset from the non-concentric core of twisted fiber 120 by a pre-configured offset at input splice point 150. In some implementations, input fiber 110 may be associated with a particular diameter (e.g., at input splice point 150). For example, input fiber 110 may be associated with a first diameter and twisted fiber 120 may be associated with a second diameter. In this case, the first diameter and the second diameter may be a common diameter. Additionally, or alternatively, the first diameter may be within a threshold amount of the second diameter, such as being within 10% of the second diameter, within 5% of the second diameter, within 1% of the second diameter, and/or the like. In some implementations, an outer cladding of input fiber 110 is aligned with an outer cladding of twisted fiber 120.

In some implementations, input fiber 110 may not be tapered. For example, input fiber 110 may not be included within tapered region 140 and/or may not be included in another tapered region separate from tapered region 140. Alternatively, input fiber 110 may be tapered. For example, after splicing input fiber 110 to twisted fiber 120, a tapering procedure may be performed to taper input fiber 110 and twisted fiber 120. In this case, the tapering procedure may cause a single continuous tapered region 140 that includes at least a portion of input fiber 110. Additionally, or alternatively, the tapering procedure may cause multiple tapered regions 140 to be defined for spliced fiber 100 and at least one of the multiple tapered regions 140 may include at least a portion of input fiber 110. In some implementations, input fiber 110 may be coupled to twisted fiber 120 after target fiber 130 is coupled to twisted fiber 120. In some implementations, input fiber 110 may be coupled to twisted fiber 120 before target fiber 130 is coupled to twisted fiber 120.

Twisted fiber 120 includes a cladded fiber with a non-concentric core section. For example, twisted fiber 120 may include a non-concentric core section that twists about an axis of the twisted fiber along a length of the twisted fiber. In some implementations, the axis of twisted fiber 120 may be a first axis that is offset from a second axis of target fiber 130 by a pre-configured core offset. Additionally, or alternatively, the first axis of twisted fiber 120 may be offset from a third axis of input fiber 110 by another pre-configured core offset (e.g., the same or a different core offset). In some implementations, twisted fiber 120 may have a pre-tapering cladding diameter of between approximately 400 micrometers (μm) and 500 μm, between approximately 100 μm and 1000 μm, and/or the like and a core diameter of between approximately 50 μm and 100 μm, between approximately 20 μm and 400 μm, and/or the like.

Figure 2:
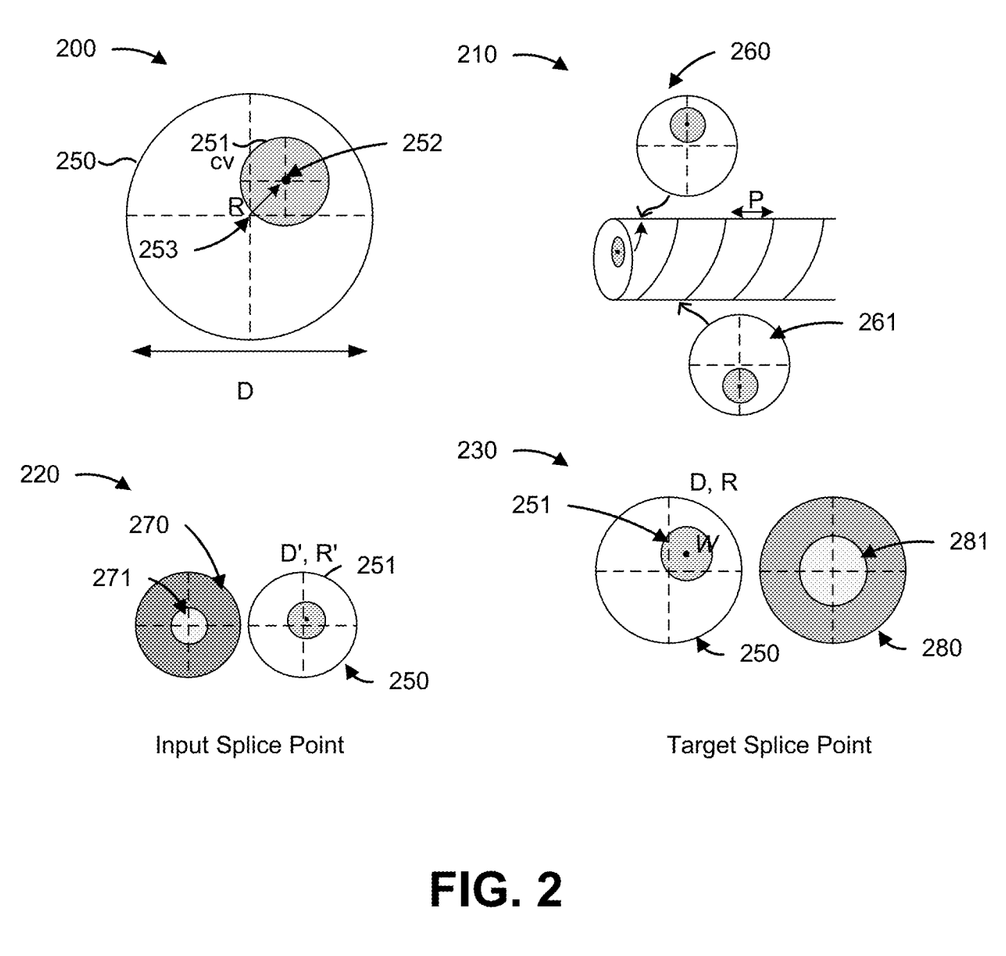
FIG. 2 is a diagram of an example implementation described herein.

In some implementations, the non-concentric core section of twisted fiber 120 may be associated with a particular pitch, P, as described herein with regard to FIG. 2. For example, the non-concentric core section may have a pitch that decreases quadratically with respect to an increase to a diameter of twisted fiber 120 in connection with being tapered. In some implementations, the increase to the pitch may result in a particular beam shape, as described in more detail herein.

Target fiber 130 may include a concentric core to receive a beam from twisted fiber 120 and provide a beam with a particular beam parameter product, beam profile, and/or beam shape. Target fiber 130 may couple to twisted fiber 120 at a target splice point 160. In some implementations, a concentric core of target fiber 130 may be offset from a non-concentric core of twisted fiber 120. For example, the concentric core of input fiber 110 may be offset from the non-concentric core of twisted fiber 120 by a pre-configured offset at target splice point 160. In some implementations, the offset may be controlled based on controlling a position of target splice point 160 relative to a taper waist (e.g., a section of tapered region 140 with a smallest diameter). In some implementations, the offset may change with respect to position along spliced fiber 100. For example, the offset may be a first offset at a first position along an axis of spliced fiber 100 and a second offset at a second position along the axis of spliced fiber 100.

In some implementations, target fiber 130 may be associated with a particular diameter (e.g., at target splice point 160). For example, target fiber 130 may be associated with a first diameter and twisted fiber 120 may be associated with a second diameter. In this case, the first diameter and the second diameter may be a common diameter. Additionally, or alternatively, the first diameter may be within a threshold amount of the second diameter, such as being within 10% of the second diameter, within 5% of the second diameter, within 1% of the second diameter, and/or the like. In some implementations, an outer cladding of target fiber 130 is aligned with an outer cladding of twisted fiber 120. In some implementations, outer claddings of input fiber 110, twisted fiber 120, and target fiber 130 are aligned.

In some implementations, target fiber 130 may be tapered. For example, after splicing target fiber 130 to twisted fiber 120, a tapering procedure may be performed to taper at least a portion of target fiber 130 and at least a portion of twisted fiber 120, such that target splice point 160 is within tapered region 140. In this case, based on controlling tapering parameters, a particular beam shape, beam profile, beam parameter product, and/or the like may be achieved. In some implementations, a portion of target fiber 130 may not be tapered. For example, a portion of target fiber 130 may extend from an end of tapered region 140 to provide an optical beam.

Tapered region 140 includes a portion of spliced fiber 100 that is tapered. In some implementations, tapered region 140 may extend from a first diameter of twisted fiber 120 to a second diameter of target fiber 130. In some implementations, tapered region 140 may be associated with a particular pitch. For example, a portion of target fiber 130 and a portion of twisted fiber 120 may be tapered to cause a preconfigured pitch at a target splice point 160, which may be different from pre-tapering pitch at target splice point 160.

In some implementations, a length of a taper defining tapered region 140 may be selected to control one or more characteristics of spliced fiber 100. For example, the length of the taper may be selected to be a preconfigured length to achieve a particular offset of a concentric core (e.g., of target fiber 130, input fiber 110, and/or a combination of both) relative to the non-concentric core of twisted fiber 120. In some implementations, the taper length may be between approximately 20 millimeters (mm) to 40 mm, between approximately 5 mm and 100 mm, and/or the like with a pitch of between approximately 4 mm and 12 mm, between approximately 2 mm and 20 mm, and/or the like. In some implementations, a portion of spliced fiber may be associated with a numerical aperture of between approximately 0.06 and 0.30. Additionally, or alternatively, the length of the taper may be selected to achieve a particular angular orientation of the non-concentric core relative to a concentric core. In some implementations, the length of the taper may be selected to achieve a particular beam characteristic. For example, the length of the taper may be selected to achieve a pre-configured modal excitation pattern, a preconfigured beam profile, a pre-configured beam parameter product, a pre-configured beam shape, and/or the like.

As indicated above, FIG. 1 is provided merely as one or more examples. Other examples may differ from what is described with regard to FIG. 1.

FIG. 2 includes a set of diagrams 200-240 of core sections described herein.

As shown in FIG. 2, and by diagram 200, a twisted fiber 250, which may correspond to twisted fiber 120, with a diameter D may include a non-concentric core section 251. Non-concentric core section 251 may have an axis 252 that is offset from an axis 253 of twisted fiber 250 by an offset R. As shown by diagram 210, non-concentric core section 251 may be twisted, such that an angular position of axis 252 changes relative to axis 253 along a length of twisted fiber 250 and axis 253. For example, at a first position shown in diagram 260, axis 252 may be at an angular position of approximately 90 degrees with respect to axis 253. In contrast, at a second position shown in diagram 261, axis 252 may be at an angular position of approximately 270 degrees with respect to axis 253. As further shown in diagram 210, a pitch of non-concentric core section 251 may refer to a distance between points at which axis 252 is at the same angular position with respect to axis 253. For example, the pitch may be a distal length along non-concentric core section 251 to complete a single revolution around axis 253.

As further shown in FIG. 2, and by diagrams 220 and 230, parameters of twisted fiber 250 may be different at an input splice point where twisted fiber 250 splices to input fiber 270 relative to a target splice point where twisted fiber 250 splices to target fiber 280. For example, at the input splice point, twisted fiber may be associated with a diameter D' and an offset R', and non-concentric core section 251 may couple to concentric core section 271 of input fiber 270, which may correspond to input fiber 110, at an angular position W'. In contrast, at the target splice point, twisted fiber 250 may be associated with a diameter D and an offset R, and non-concentric core section 251 may couple to concentric core section 281 of target fiber 280, which may correspond to target fiber 130, at an angular position W.

As indicated above, FIG. 2 is provided merely as one or more examples. Other examples may differ from what is described with regard to FIG. 2.

Figure 3A:
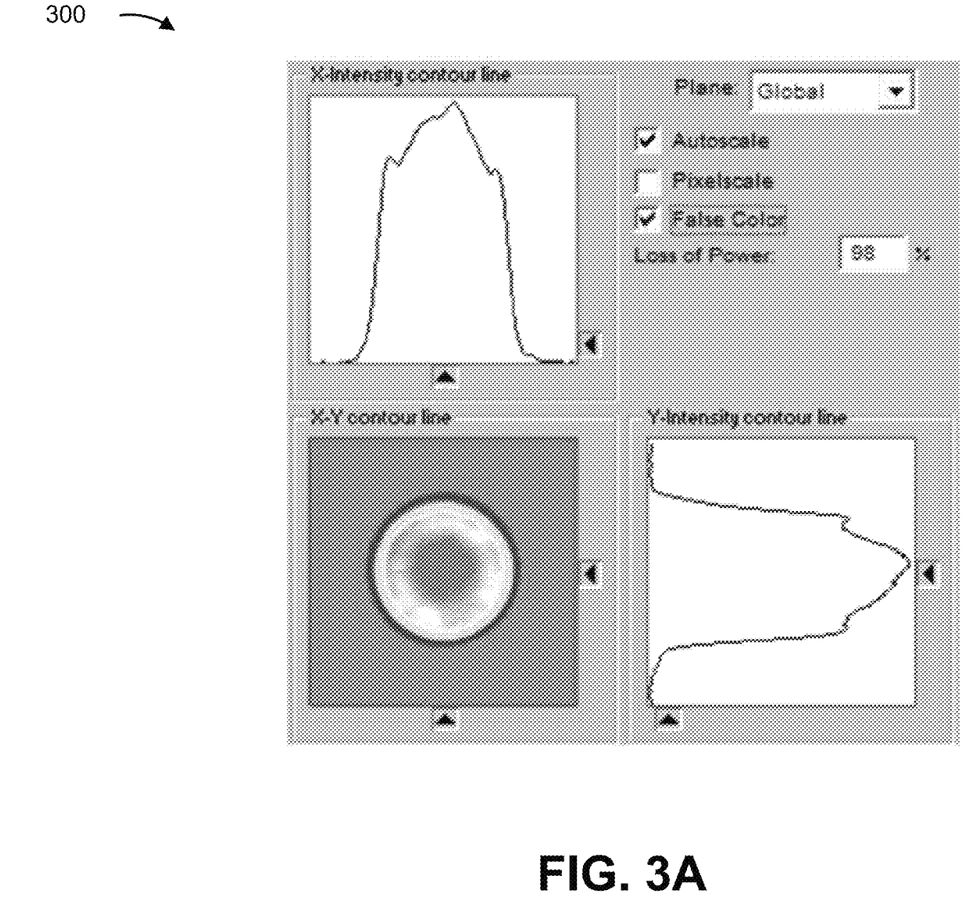
FIGS. 3A-3C are diagrams of optical characteristics of an optical beam output from an example implementation described herein.
Figure 3B:
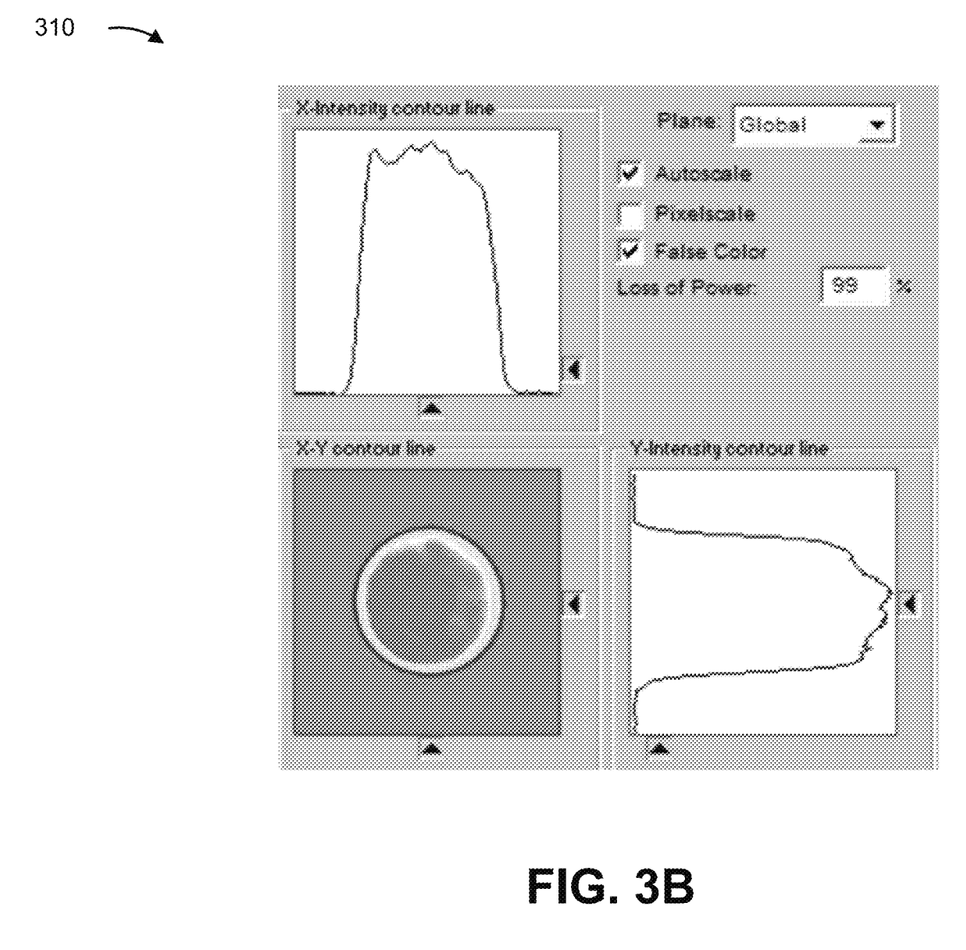
Figure 3C:
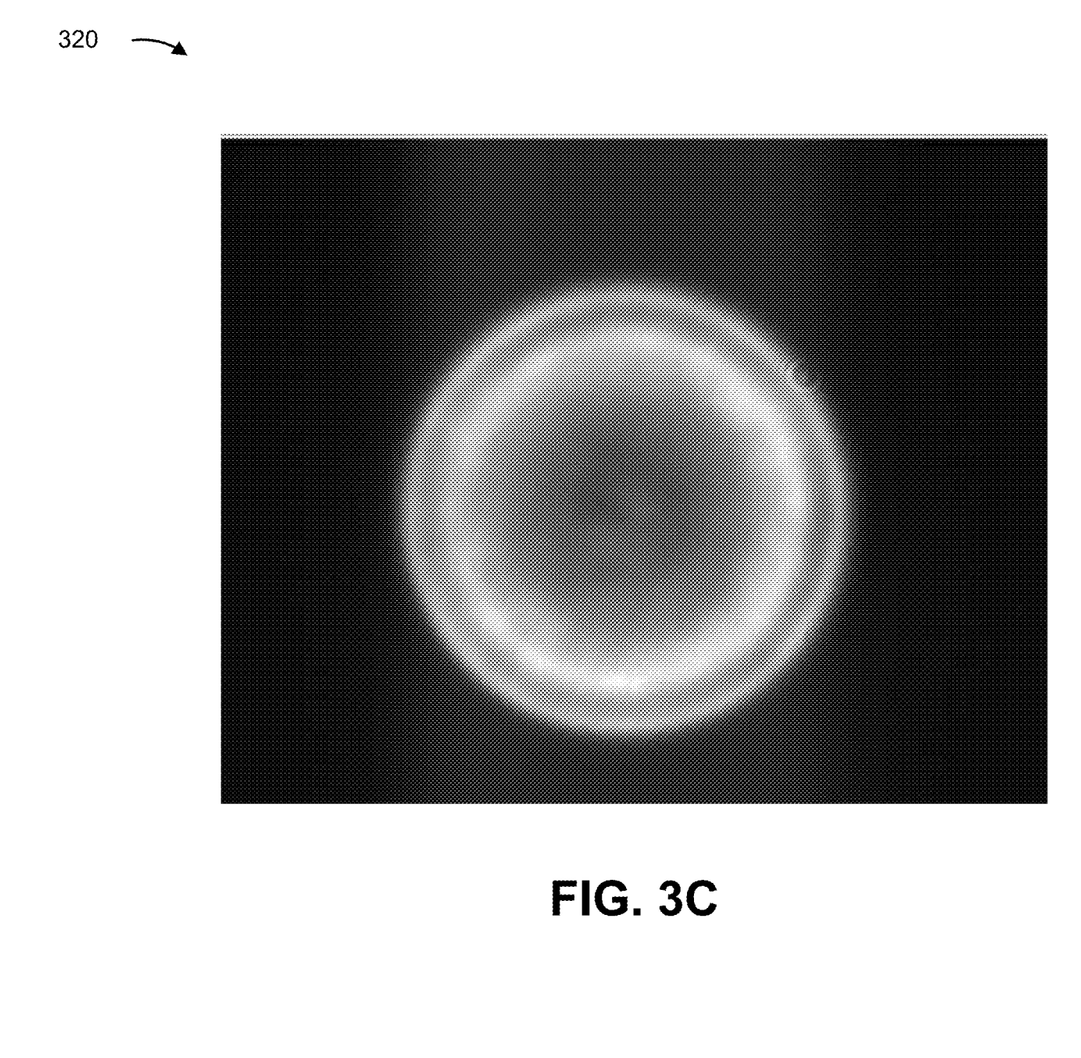

FIGS. 3A-3C includes a set of diagrams 300-320 of beam characteristics described herein.

As shown in FIGS. 3A-3C, using an offset-core fiber with a mid-taper splice, as described herein, may enable different types of beam shapes with different beam parameter products. For example, by altering a position of a fiber splice point (e.g., the target fiber splice point) within the taper (e.g., relative to a taper waist), a rounded-shaped beam output with a relatively low beam parameter product may be achieved, as shown by diagram 300. Similarly, at another position of the fiber splice point (e.g., relative to the taper waist), a top-hat-shaped beam may be output with a relatively higher beam parameter product, as shown by diagram 310. Similarly, yet another position of the fiber splice point (e.g., relative to the taper waist), a ring-shaped beam may be output, as shown by diagram 320. As an example, moving a splice position from relatively close to an input fiber to relatively close to a target fiber may cause a beam shape to be shifted from a Gaussian beam shape, to a top hat beam shape, to an annulus beam shape.

As indicated above, FIGS. 3A-3C are provided merely as one or more examples. Other examples may differ from what is described with regard to FIGS. 3A-3C.

Figure 4:
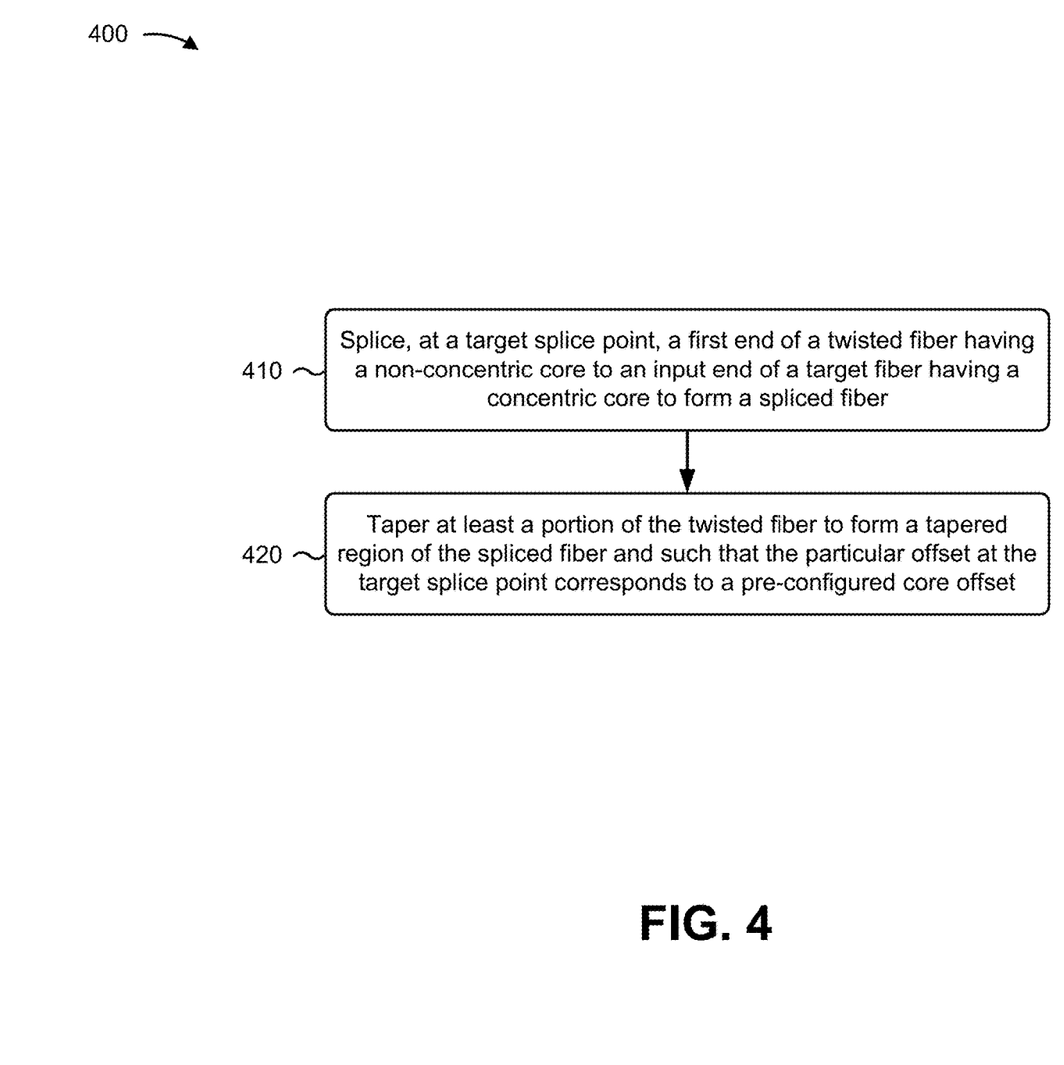
FIG. 4 is a flowchart of an example process for coupling a first fiber to a second fiber with a mid-taper splice.

FIG. 4 is a flow chart of an example process 400 for manufacturing a spliced fiber. In some implementations, one or more process blocks of FIG. 4 may be performed by a device (e.g., fiber splicing device, a fiber tapering device, a micromachining system, a manufacturing device, and/or the like).

As shown in FIG. 4, process 400 may include splicing, at a target splice point, a first end of a twisted fiber having a non-concentric core to an input end of a target fiber having a concentric core to form a spliced fiber (block 410). For example, the device may splice a first end of a twisted fiber having a non-concentric core to an input end of a target fiber having a concentric core to form a spliced fiber, as described above. In some implementations, the concentric core of the target fiber and the non-concentric core of the twisted fiber have a particular offset at the target splice point.

In some implementations, process 400 may include splicing, at an input splice point, a second end of the twisted fiber to an output end of an input fiber having another concentric core. For example, after splicing the target fiber to the first end of the twisted fiber, the device may splice the input fiber to the second end of the twisted fiber. In this way, a spliced fiber is formed to convey a beam with a particular beam shape, as described above. In some implementations, the other concentric core of the input fiber and the non-concentric core of the twisted fiber have another offset at the input splice point. In some implementations, to splice the input fiber to the twisted fiber, process 400 may include cleaving the second end of the twisted fiber. For example, the second end of the twisted fiber may be cleaved and spliced to the output end of the input fiber based on cleaving the second end of the twisted fiber. In some implementations, the first end of the twisted fiber may be cleaved to enable splicing of the target fiber to the twisted fiber.

In some implementations, to splice the target fiber to the twisted fiber, process 400 may include aligning an outer cladding of the twisted fiber to an outer cladding of the target fiber. For example, the first end of the twisted fiber may be spliced to the input end of the target fiber based on aligning the outer claddings of the twisted fiber and the target fiber.

As further shown in FIG. 4, process 400 may include tapering at least a portion of the twisted fiber to form a tapered region of the spliced fiber and such that the particular offset at the target splice point corresponds to a pre-configured core offset (block 420). For example, the device may taper at least a portion of the twisted fiber to form a tapered region of the spliced fiber and such that the particular offset at the target splice point corresponds to a pre-configured core offset, as described above. In some implementations, the target splice point is within the tapered region of the spliced fiber.

In some implementations, tapering the at least the portion of the twisted fiber includes tapering the at least the portion of the twisted fiber and at least a portion of the target fiber to form the tapered region of the spliced fiber. For example, the tapering process may include tapering some of the twisted fiber and some of the target fiber based on splicing the twisted fiber to the target fiber. Additionally, or alternatively, the tapering process may include tapering all of the twisted fiber, tapering all of the target fiber, and/or the like.

In some implementations, the twisted fiber and the target fiber may be tapered such that a pitch at the target splice point is a pre-configured pitch that is different from a pre-tapering pitch. For example, parameters of the taper may be selected to alter the pitch from a pre-tapering pitch to a pre-configured pitch to achieve a pre-configured set of beam parameters. Additionally, or alternatively, a length of a taper of the twisted fiber and the target fiber is selected to control an offset or angular orientation of the non-concentric core relative to the concentric core. Additionally, or alternatively, parameters of the taper may be selected such that an angular orientation of the non-concentric core at the target splice point is a pre-configured angular orientation. Additionally, or alternatively, parameters of the taper may be selected such that the target fiber is configured to achieve a pre-configured modal excitation pattern associated with a pre-configured beam profile.

Process 400 may include additional implementations, such as any single implementation or any combination of implementations described herein and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

Satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   splicing, by a device and at a target splice point, a first end of a twisted fiber having a non-concentric core to an input end of a target fiber having a concentric core to form a spliced fiber,
   wherein the concentric core of the target fiber and the non-concentric core of the twisted fiber have a particular offset at the target splice point; and
   tapering, by the device, at least a portion of the twisted fiber to form a tapered region of the spliced fiber and such that the particular offset at the target splice point corresponds to a pre-configured core offset,
   wherein the target splice point is within the tapered region of the spliced fiber.

2. The method of claim 1, wherein tapering the at least the portion of the twisted fiber comprises:
   tapering the at least the portion of the twisted fiber and at least a portion of the target fiber to form the tapered region of the spliced fiber.

3. The method of claim 1, further comprising:
   splicing, at an input splice point, a second end of the twisted fiber to an output end of an input fiber having another concentric core,
   wherein the other concentric core of the input fiber and the non-concentric core of the twisted fiber have another offset at the input splice point.

4. The method of claim 3, further comprising:
   cleaving the second end of the twisted fiber; and
   wherein splicing the second end of the twisted fiber to the output end of the input fiber comprises:
      splicing the second end of the twisted fiber to the output end of the input fiber based on cleaving the second end of the twisted fiber.

5. The method of claim 1, further comprising:
   aligning an outer cladding of the twisted fiber to an outer cladding of the target fiber; and
   wherein splicing the first end of the twisted fiber to the input end of a target fiber comprises:
      splicing the first end of the twisted fiber to the input end of a target fiber based on aligning the outer cladding of the twisted fiber to the outer cladding of the target fiber.

6. The method of claim 1, wherein tapering the at least the portion of the twisted fiber comprises:
   tapering at least a portion of the twisted fiber and at least a portion of the target fiber, such that a pitch at the target splice point is a pre-configured pitch that is different from a pre-tapering pitch.

7. The method of claim 1, wherein a length of a taper is selected to control an offset or angular orientation of the non-concentric core relative to the concentric core.

8. The method of claim 1, wherein tapering the at least the portion of the twisted fiber comprises:
   tapering the at least the portion of the twisted fiber and at least a portion of the target fiber, such that an angular orientation of the non-concentric core at the target splice point is a pre-configured angular orientation.

9. The method of claim 1, wherein tapering the at least the portion of the twisted fiber comprises:
   tapering the at least the portion of the twisted fiber and at least a portion of the target fiber, such that the target fiber is configured to achieve a pre-configured modal excitation pattern associated with a pre-configured beam profile.

10. A spliced fiber, comprising:
    a twisted fiber having a non-concentric core section that twists about an axis of the twisted fiber along a length of the twisted fiber; and
    a target fiber spliced to the twisted fiber at a target splice point and having a concentric core section,
    wherein a tapered region of the spliced fiber includes at least a portion of the twisted fiber and at least a portion of the target fiber such that the target splice point is within the tapered region, and
    wherein the tapered region is tapered such that an offset, at the target splice point, of a first axis of the non-concentric core section and a second axis of the concentric core section corresponds to a pre-configured core offset.

11. The spliced fiber of claim 10, further comprising:
    an input fiber spliced to the twisted fiber at an input splice point and having another concentric core section,
    wherein another offset, at the input splice point, of a third axis of the other concentric core section and the first axis of the non-concentric core section corresponds to another pre-configured offset at the input splice point.

12. The spliced fiber of claim 11, wherein the input fiber at the input splice point has a first diameter and the twisted fiber at the input splice point has a second diameter, and
    wherein the first diameter and the second diameter are within a threshold amount.

13. The spliced fiber of claim 10, wherein a portion of the twisted fiber not within the tapered region has a first diameter and a portion of the target fiber not within the tapered region has a second diameter that is different from the first diameter.

14. The spliced fiber of claim 13, wherein a diameter of the tapered region changes from the first diameter to the second diameter along a length of the tapered region.

15. The spliced fiber of claim 10, further comprising:
    a cladding disposed around the target fiber and the twisted fiber.

16. The spliced fiber of claim 10, wherein the offset changes with respect to position along the spliced fiber.

17. A twisted fiber, comprising:
    a non-concentric core section that twists about an axis of the twisted fiber along a length of the twisted fiber;
    a first end to receive a target fiber with a first concentric core section at a target splice point; and
    a second end to receive an input fiber with a second concentric core section at an input splice point,
    wherein at least a portion of the twisted fiber is tapered to form a tapered region such that the target splice point is included within the tapered region, and
    wherein an offset, at the target splice point, of a first axis of the non-concentric core section and a second axis of the concentric core section corresponds to a pre-configured core offset.

18. The twisted fiber of claim 17, wherein the second end is cleaved to receive the input fiber.

19. The twisted fiber of claim 17, further comprising:
    a cladding to align to a corresponding cladding of the target fiber.

20. The twisted fiber of claim 17, wherein a length of the tapered region is selected to achieve a pre-configured set of beam parameters.

* * * * *